United States Patent [19]
Peltzer et al.

[11] Patent Number: 5,359,432
[45] Date of Patent: Oct. 25, 1994

[54] PRINTER PAGE COMPOSITION WITH COLOR AND TEXT

[75] Inventors: Bruce A. Peltzer; Robert S. Samson, both of Lexington, Ky.

[73] Assignee: Lexmark International, Inc., Greenwich, Conn.

[21] Appl. No.: 797,669

[22] Filed: Nov. 25, 1991

[51] Int. Cl.⁵ .......................................... H04N 11/04
[52] U.S. Cl. ................................... 358/452; 358/280; 358/283; 358/461
[58] Field of Search ............... 358/257, 260, 280, 285, 358/298, 283, 256, 261, 452, 13, 135, 136, 138, 11, 464, 456, 447, 451, 479, 433, 442, 445, 455, 457, 284, 133, 263; 364/519

[56] References Cited

U.S. PATENT DOCUMENTS

| | | | |
|---|---|---|---|
| 4,280,144 | 7/1981 | Bacon | 358/280 |
| 4,394,693 | 7/1983 | Shirley | 358/298 |
| 4,532,554 | 7/1985 | Skala | 358/257 |
| 4,532,651 | 7/1985 | Pennebaker, Jr. et al. | 358/284 X |
| 4,554,593 | 11/1985 | Fox et al. | 358/282 |
| 4,598,283 | 7/1986 | Tung et al. | 340/731 |
| 4,599,656 | 7/1986 | Bellinghausen | 358/261 |
| 4,623,978 | 11/1986 | Aoki | 364/519 |
| 4,673,977 | 6/1987 | Stelzenmuller | 358/133 |
| 4,675,743 | 6/1987 | Riseman et al. | 358/263 |
| 4,677,571 | 6/1987 | Riseman et al. | 364/519 |
| 4,686,578 | 8/1987 | Asano | 358/280 |
| 4,725,892 | 2/1988 | Suzuki et al. | 358/287 |
| 4,766,499 | 8/1988 | Inuzuka | 358/283 |
| 4,807,981 | 2/1989 | Takizawa et al. | 350/404 |
| 4,808,986 | 2/1989 | Mansfield et al. | 340/747 |
| 4,811,109 | 3/1989 | Shimizu et al. | 358/256 |
| 4,872,064 | 10/1989 | Tutt et al. | 358/464 |
| 4,937,682 | 6/1990 | Dalton | 358/461 |
| 4,953,104 | 8/1990 | Yeh et al. | 364/519 |
| 4,963,898 | 10/1990 | Kadowaki et al. | 346/157 |
| 4,974,171 | 11/1990 | Yeh et al. | 364/519 |
| 5,003,494 | 3/1991 | Ng | 364/519 |
| 5,220,410 | 6/1993 | Wakeland et al. | 358/13 |
| 5,235,432 | 8/1993 | Creedon et al. | 358/479 |

FOREIGN PATENT DOCUMENTS

| | | | |
|---|---|---|---|
| 115584 | 8/1984 | European Pat. Off. | G09G 1/00 |
| 343584 | 11/1989 | European Pat. Off. | H04N 1/415 |

OTHER PUBLICATIONS

JP 3069377, Mar. 25, 1991, Color Printing Controller (Abstract).

*Primary Examiner*—Paul Ip
*Attorney, Agent, or Firm*—John A. Brady

[57] ABSTRACT

Page description information received from an interpreter is composed into color plane memories as basic pels for line information and larger, 4 by 2 basic pels for color information, with intensity information for larger color pels also in the color plane memories. A separate color pel memory stores the meaning of the larger pels. Intensity is printed by filling parts of the 4 by 2 color pels as dictated by the intensity information.

13 Claims, 4 Drawing Sheets

Rectangle(x,y,h,w)

Scan0(x,y,h,w,data*
[table of one bits])

PRINTER PAGE COMPOSITION WITH COLOR AND TEXT

DESCRIPTION

1. Technical Field

This invention relates to printing in multiple colors or shades from control information assigned to small, individual page locations, usually designated as pixels or pels (believed derived from the term "picture elements"). The printing at pel locations is defined by information for each pel location stored in memory. This invention is directed to the composition for subsequent printing of the memory of pel information to permit both color tones and text and other binary data to be printed compatibly in the same page.

2. Background of the Invention

For the purposes of this application the term "intensity" refers to the saturation value, which is the continuum between dark or light of a given color hue. For printing at high resolution, such as 600 by 600 pels per inch, and with a broad palette of colors or shades, memory requirements may be prohibitive. Use of an eight bit byte to describe the intensity of color for each pel in 600 by 600 resolution dedicates 360,000 (the number of pels per square inch) times eight (the bits per pel) times 8.5 times 11 (the letter page size), multiplying to 256 million bits, or 32 million bytes for a stored description in one color. For high quality color four color planes, one each for three primary colors and black, are needed to describe a color page to be printed.

To reduce such memory requirements, it is known, as in U.S. Pat. No. 5,003,494 to Ng, to treat a group of contiguous pels as identical (i.e., constituting one color). Ng discloses examining color pel information to see if some of the constituent pels contain text information. Where that is the case, color value in that group of color pels may be defined in less detail than when the color pels have no such information.

U.S. Pat. No. 4,974,171 and 4,953,104, both to Yeh et al, and having much similar content, disclose an intermediate full page memory composition prior to final pel by pel composition in which data is stored in different modes. The color mode has the same color in each of a group of pels to save memory. The text and line mode assigns a color to each pel. The instant invention is directed to final pel by pel composition and does not employ an intermediate bit map of the entire page.

U.S. Pat. No. 4,677,571 and 4,675,743, both to Riseman et al, and having much similar content, disclose what is called a cell or a super pixel, which contains several smaller pixels. A single data byte employs a predetermined number of bits as range of intensity or gray scale information for the entire super pixel and other bits as location and more limited gray scale information for the pixels of the super pixel in which text or graphics information is to appear in the super pixel. A specific example of bits allocated to gray scale information is 6, which provides 64 levels of gray scale.

U.S. Pat. No. 4,963,898 to Kadowaki et al is of general interest primarily in that it discloses employing three color planes.

DISCLOSURE OF THE INVENTION

In accordance with this invention, color or shade areas are unified as one large pel (termed here shade pels) having one intensity stored for each shade pel. In the final page map in memory, bit positions associated with the shade pels carry intensity information, and the existence of shade pels is specified in a shade pel memory. Text and graphics information is defined on each of the smaller pels (termed here basic pels) with binary intensity information stored for the basic pels. The composition of a memory defining a page according to shade and basic pels may take place in any order. The positions of shade pels are predefined, but are employed as such only when information identified as color or shade area information occurs within a shade pel area. In one embodiment, the last intensity information received for any part of a shade pel is applied to the entire shade pel. When other information defines graphics or text (termed here line information) in a shade pel employed as such, that may be honored or discarded depending on the desired visual effect and the data processing capabilities available. When honored, color in the remaining basic pels of that shade pel may be approximated by filling a selected number of the basic pels (commonly known as dithering).

BRIEF DESCRIPTION OF THE DRAWING

The details of this invention will be described, in connection with the accompanying drawing, in which.

BEST MODE FOR CARRYING OUT THE INVENTION

Figure 1:
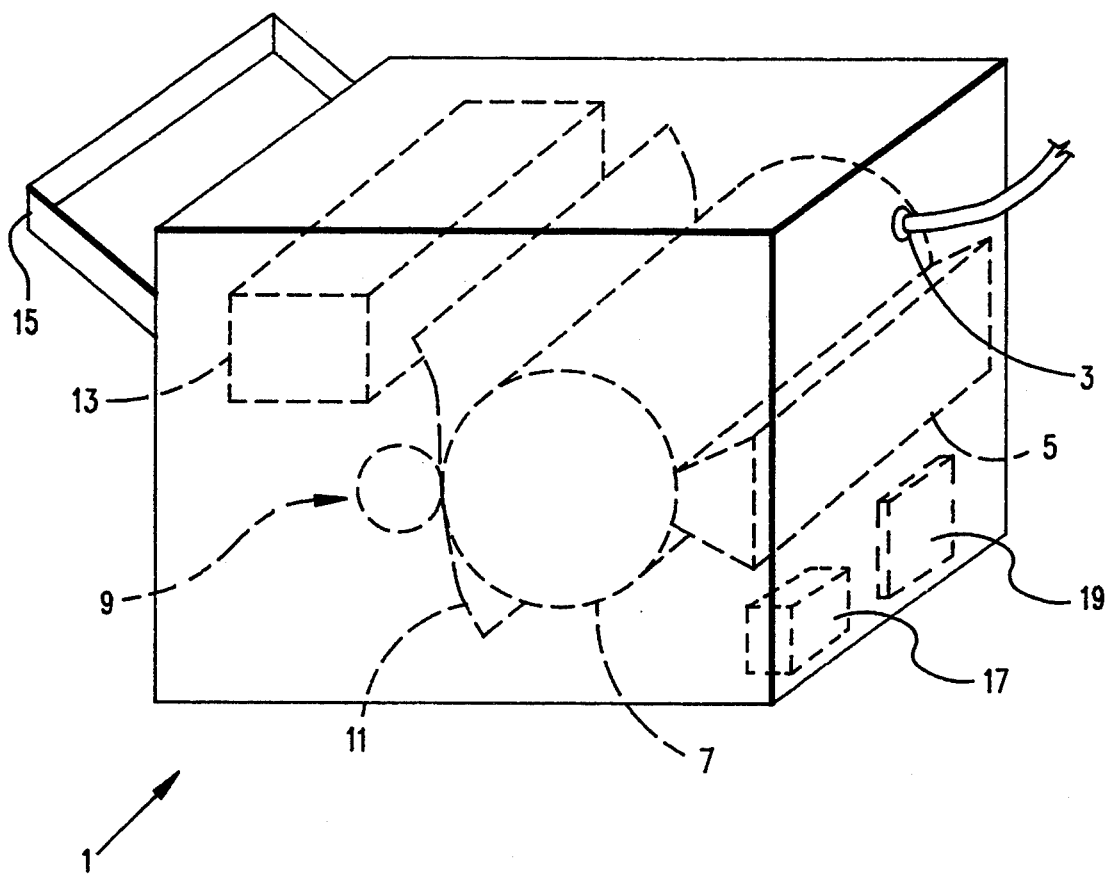
FIG. 1 illustrates a printer having page map composition in accordance with this invention.

Page information to be printed by the printer 1 (FIG. 1) in accordance with this invention may originate from any source, and origination of such information is preexisting to this invention. A typical source would be the existing software composition applications to write in the page description language for the PostScript interpreter of Adobe Systems Incorporated. These applications produce output in which color boundaries are defined as vector and shape descriptions in the software produced, as well as hue and intensity, and line information.

That page information is received by printer 1 in a standard manner from a communications cable 3. Printer 1 may be any suitable printer. For illustrative purposes printer 1 is shown suggestive of an electrophotographic printer having an optical system 5 operative on drum 7. Drum 7 transfers image defined by optical system 5 at transfer station 9 to paper 11. The image is fixed, typically by heat, at fixing station 13, and the finished printed page is delivered to output tray 15.

Data processor 17 in printer 1 interprets the page description information on a running or "real time" basis so that the color and intensity of each basic pel of the image to be printed for each color plane is determined for areas of color and the existence or not of printing in each basic pel for lines to be printed is determined. The related information need be maintained only long enough to forward bit information in accordance with this invention. Therefore, interpretation of the page description language to produce location and visual content information for all basic pels of the page image does not require prohibitive storage. This invention accepts such information to compose and store in electronic memory a full page of basic pel and shade pel information.

The information typically is received in any order with respect to position on the final page. In the preferred embodiment, information from the interpreter accompanies data processing calls to routines executed in data processor 17 to implement this invention. Thus, preliminary to the composition of a page, routines are called which allocate data processing memory 19 in five separate sections, each reserving one bit for each potential basic pel and reserving a large number of bytes (roughly 3,000 for all but the shade pel section) as overall control information (often called header information) for the five separate sections. One of the sections is a shade pel map, which is employed to tag the existence of contiguous rectangular shade pels corresponding in size and position to 4 basic pels horizontally by 2 basic pels vertically. The header of a second section defines that section for cyan. The header of another section defines that section for magenta. The header of another section defines that section for yellow. And the header of the remaining section defines that section for black. Cyan, magenta, and yellow are, of course, the three primary subtractive colors and are selected for that reason. Such allocation of memory with headers may be achieved with standard data processing techniques without essentially enhancing or impairing this invention and therefore will not be further elaborated. These allocated sections of memory for three colors and black will be termed color plane memories. The allocated section of memory to make shade pels will be termed the shade pel memory.

Following such establishment of color plane memories and a shade pel memory, one of two routines will be called to effect further entry in the headers. One routine is Set Generation Mode. This enters into the header of each color plane memory control information dictating how foreground and background pels are to be interpreted prior to entry for each pel in the color plane memory. A foreground pel is one to be treated as part of the object being processed; a background pel is one excluded. For example, in processing a bit mask representation of the letter A, those pels forming the strokes of the letter may be foreground pels, while those pels in the rectangular bit mask but not part of the character are considered background. These would be represented by binary one and zero in the bit mask respectively. In each header both foreground and background is set for one of four functions as follows: set, reset, unchanged, or toggle. The foreground function determines the action performed on pels in the bit map corresponding to one bits in the bit mask. They are either set (turned to binary one), reset (turned to binary zero), unchanged, or toggled (a one in the bit map is changed to zero or vice versa). The background function makes the same determination for zero bits in the bit mask. A zero bit results in the corresponding bit in the bit map being set (turned to binary one), reset (turned to binary zero), unchanged, or toggled. Accordingly, a character bit mask operated on in the set foreground and unchanged background will enter into the bit map the character superimposed over any pattern already in the bit map. Such header information may be changed by the interpreter prior to each of the routines discussed below.

The other routine which may be called following establishment of color planes is Set and Define Dither (sometimes termed Set Tile). Dither is a known method of achieving shades of color by spacing small dots of color so that the background white and the color are integrated by the eye. When printing text or line information, color is achieved by dithering. The Set and Define Dither puts in the headers a control code dictating dithering and a pattern, ending on byte boundaries for operating convenience in replicating the pattern. The dither pattern for each active color plane may be identical since the colors are subtractive, but other color schemes may be used so the pattern is not necessarily identical. Where the color intensity is to be high, the dither pattern will be predominately ones to define where color is to appear. Where color intensity is to be low, the dither pattern will be predominately zeros which define where paper background is to appear. This header information may be changed by the interpreter prior to each of the routines discussed below. This dithering is essentially conventional and may be otherwise achieved with standard techniques without essentially enhancing or impairing this invention and therefore will not be elaborated.

Figure 2:
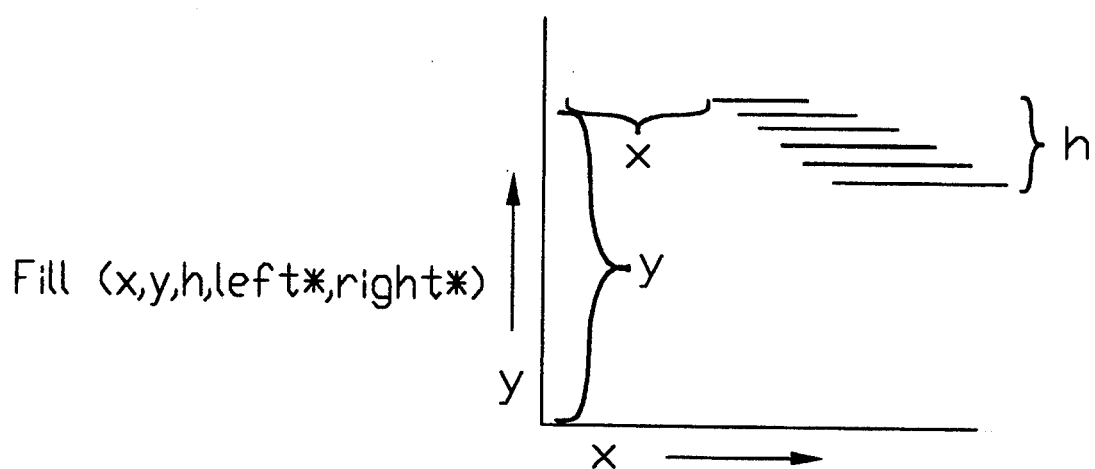
FIG. 2 illustrates the Fill routine.

The next information will call one of six routines for line printing or the one routine for printing color in shade pels in accordance with this invention. One line routine is Fill, which takes referenced coordinate points (standard Cartesian x, y coordinates) presented by the interpreter and address pointers to a list of start and end points stored in a table by the interpreter. Each of the four color plane memories are specified by separate Fill routines, and these start and end points are implemented on successive lines of the memory plane specified. FIG. 2 is illustrative of a Fill routine for one color plane, for example the cyan or the black color plane. On the left the control information from the interpreter for a Fill operation is summarized in abbreviated form as x,y,h,left,* right*. These parameters, of course, are in binary (ones and zeros) form of standard data processing information. The x information specifies the exact horizontal location of the starting pel on the bit map of basic pels for the fill operation. The y information specifies the exact vertical location of the starting pel on the bit map of basic pels for the Fill operation. The h information specifies the number of lines to be printed in this Fill operation. The left* and right* are addresses to a table stored by the interpreter of the left differential from x and the right differential from x for each line, the number of such left and right pairs being the same as h. The figure on the right is generally illustrative of a Fill command in which the left* increases with each line and the right* increases at twice the value of the left*. The area defined by the Fill Operation is treated as all foreground, and therefore any background operation in the header is irrelevant. The Fill operation is essentially conventional and may be achieved with standard techniques without essentially enhancing or impairing this invention and therefore will not be further elaborated.

Figure 3:
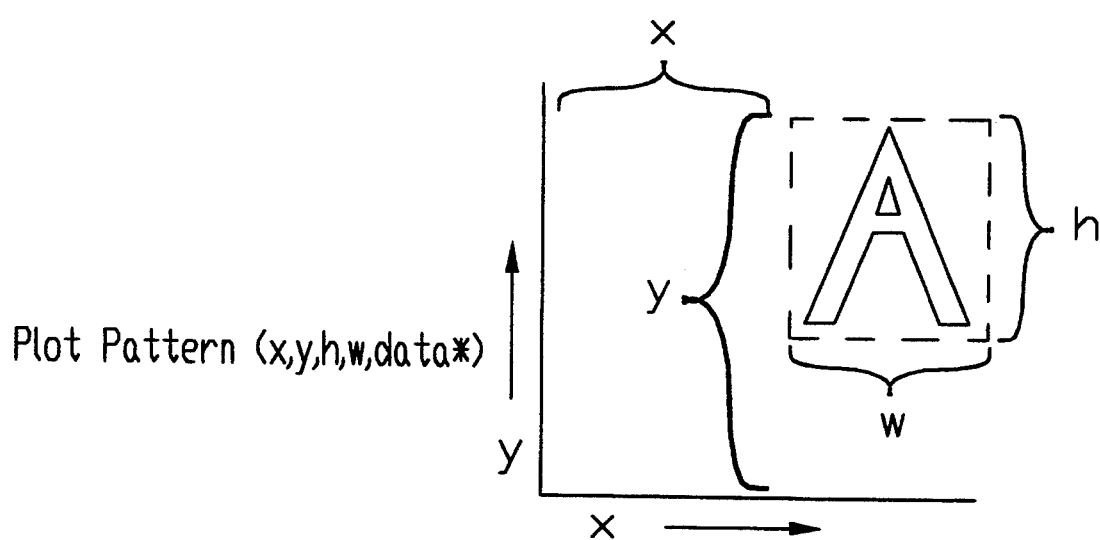
FIG. 3 illustrates the Plot Pattern routine.

Another line routine is Plot Pattern, which replicates a stored pattern or bit mask into a position defined by referenced coordinate points in a size dictated by the Plot Pattern routine. The pattern is typically an alphabetic character or standard graphic symbol stored digitally in an electronic memory, as is now widely conventional. Each of the four color plane memories are specified by separate Plot Pattern routines. FIG. 3 is illustrative of a Plot Pattern routine for one color plane. On the left the control information from the interpreter for a Plot Pattern instruction is summarized. The x information specifies the exact horizontal location of the starting pel on the bit map of basic pels for the Plot Pattern fill operation. The y information specifies the exact vertical location of the starting pel on the bit map of basic pels for the Plot Patterns operation. The h information specifies the height of the symbol in scan lines and the w information specifies the width of the symbol in basic pels. Data* specifies the memory location of the pattern to be employed. The figure on the right is illustrative of a Plot Pattern command in which the pattern is the letter "A." The Plot Pattern operation is essentially conventional and may be achieved with standard techniques without essentially enhancing or impairing this invention and therefore will not be further elaborated.

Figure 4:
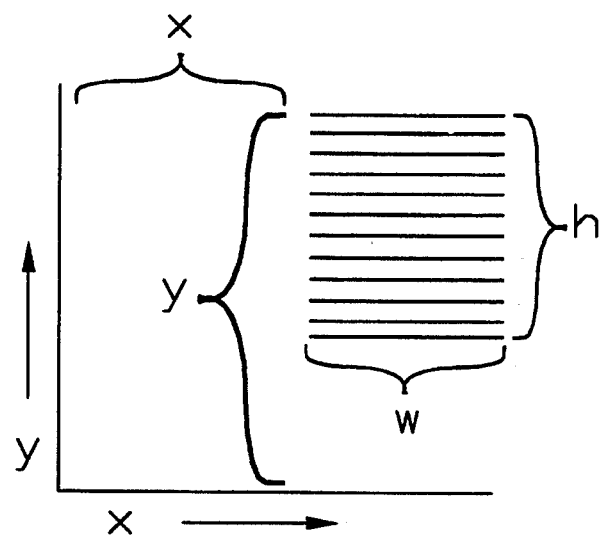
FIG. 4 illustrates the Rectangle routine.

Another line routine is Rectangle, which achieves data processing operating efficiencies by specifying only x, y, h, and w having the same meaning as for Plot Pattern. Contiguous lines are made in the page map basic pel memory in a rectangle defined by h and w and located by x and y, as illustrated in FIG. 4. A separate Rectangle routine is presented for each color plane. The Rectangle routine is somewhat of a simplification of the Fill routine and is essentially conventional and may be achieved with standard techniques without essentially enhancing or impairing this invention and therefore will not be further elaborated.

For each of the foregoing routines, there is a corresponding color routine (for example Color Fill). The color routine is closely similar to the foregoing routine except the instruction dictates identical parameters for all of the color planes, the effect on each color plane being altered by the header information for each plane. Operating efficiencies are realized by using the same table of starting and ending points for each plane. As an example, to print pure magenta a Color Fill routine might be executed, with foreground in the magenta color plane header at set and the foreground of the other color planes at reset.

Figure 5:
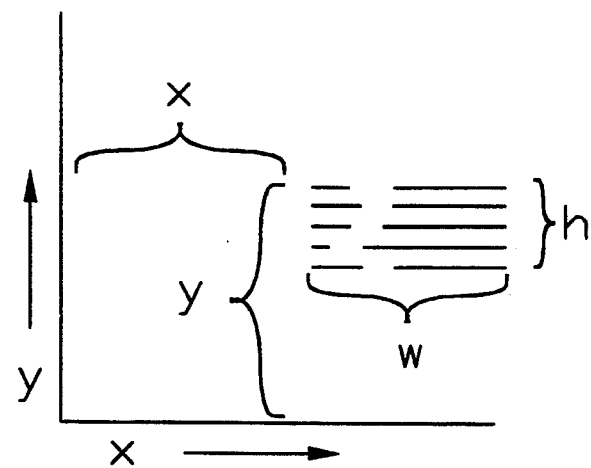
FIG. 5 illustrates the ScanO routine.

The remaining line routine is Scan0. Scan0 provides operating efficiencies over Fill when the data changes rapidly. Scan0 defines x, y, h, w, and data*. The data* points to an array of binary values. These values are stored consecutively in basic pels in the area having upper left point of x and y and height h and width w. As illustrated in FIG. 5, data is stored from left to right and from top to bottom with each pel being one or zero depending upon the bit stored at the corresponding data* address.

Figure 6:
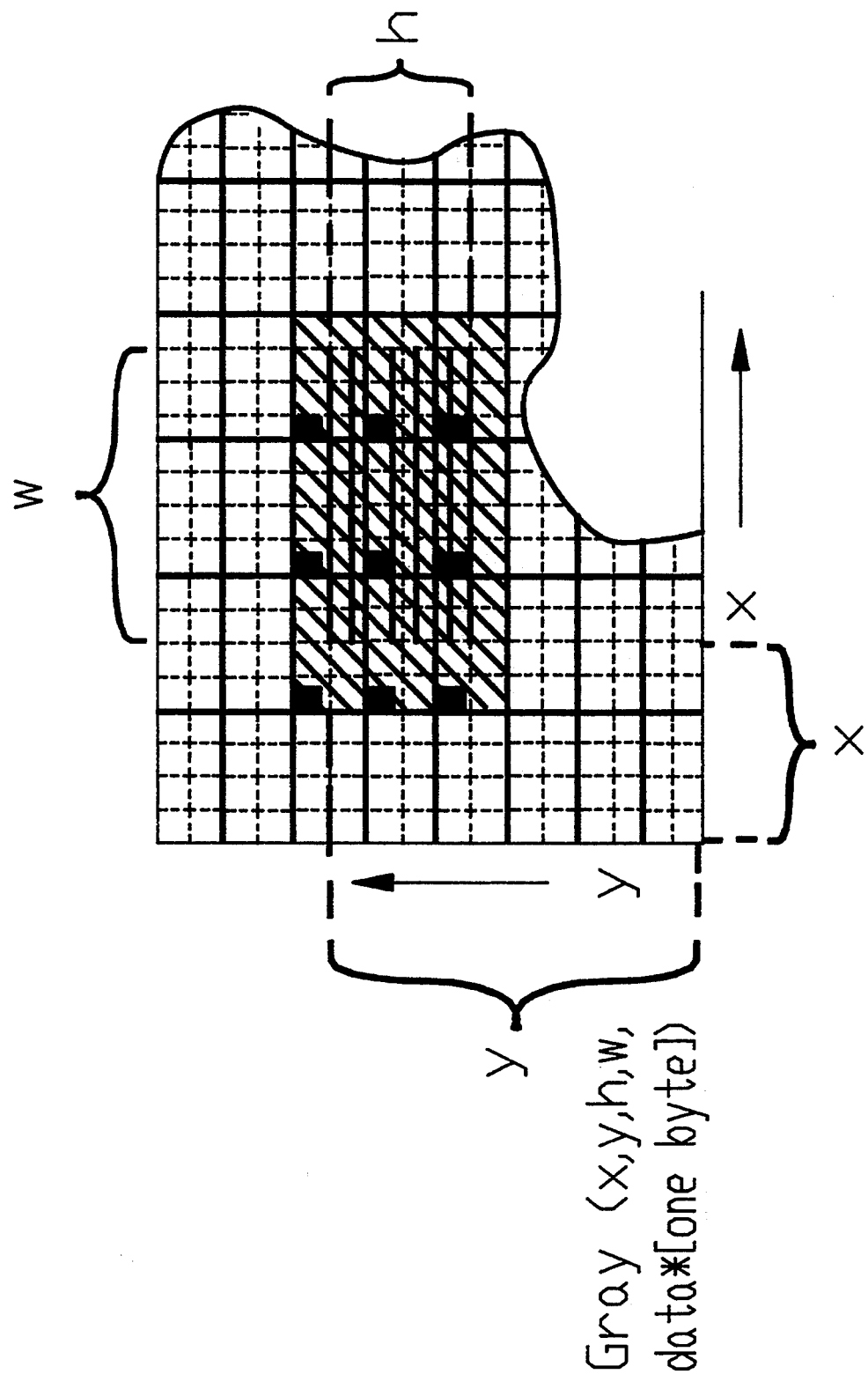
FIG. 6 illustrates a superimposed shade pel plane on a Gray routine.

The shade routine is Gray. Gray is much like Scan0 except that data* points to an array of eight bit codes defining intensity for the pels in the entire area defined. The x, y, h and w information have the same function as in the foregoing routines. Gray is implemented by the gray routine placing the eight bit code in every shade pel in or partly in the area defined by x, y, h, w, by tagging the shade pel map at a predetermined point corresponding to each shade pel defined by x, y, h, and w, and by storing the eight bit intensity information in the basic pel locations of the shade pel in the final bit map. FIG. 6 shows for purposes of illustration part of a final basic pel bit map with a shade pel plane superimposed over it. Where an area defined by Gray crosses a shade pel area, the shade pel memory is marked by a one. This is shown illustratively in FIG. 6 by the upper left pel of each shade pel effective as such black. Also, all of the shade pels rendered effective as such by the Gray routine are shaded in FIG. 6.

Subsequent information from the interpreter may define binary information for one or more basic pels of a shade pel. Accordingly, prior to any entry of data as a basic pel, the shade pel memory is interrogated for the shade pel encompassing the same area. If a shade pel has already been designated where subsequent line information is to be stored, the previous eight bit intensity code for each memory plane is employed in a table look up to dither information which will approximate the previous shade color, and that information is entered in the remaining basic pels of the former shade pel in each memory plane as specified by the table information for the dither. The new line information is then entered, and the designation of the shade pel as such is removed from the shade pel memory. If a shade pel is designated where previous line information or shade pel information is stored, as an operating convenience in the preferred embodiment that previous information is replaced by the new shade pel information.

A page is completed when the interpreter signals the end of page, which normally is done after the interpreter has delivered routines as described above which encompass the entire page to be printed. When the last of such routines is acted upon as described, each color plane memory contains information the character of which is either binary information for each basic pel or intensity information for each shade pel. Where the shade pel memory is tagged, described illustratively here as having a binary one in the upper left basic pel, the eight corresponding bits in each color plane contain intensity information for that shade pel of that color plane. Otherwise, the eight corresponding bits in each color plane define a binary print or not print of that color in the corresponding basic pel.

Figure 7:
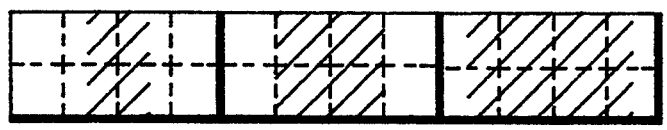
FIG. 7 illustrates shade pel as color is applied for low, intermediate, and high intensity.

The printer itself is operated essentially binary as to whether or not it prints a certain color on a defined area since the thickness of toner is not assumed to vary. The intensities of the shade pels are achieved by printing less than all of the area of a shade pel, in accordance with the intensity. The area to be printed is continuously variable at equal to or less than the precision of the intensity data. The shade pels are very small to the eye and integrate the background white of final printing with the color printed in part of a shade pel to give as a degree of intensity. FIG. 7 shows three shade pels with the cross hatched area showing roughly where the imaging operation is applied by optics of the printer, the left shade pel has low intensity and therefore has a small area of color applied in the center, the central pel has intermediate intensity and therefore has roughly one-half of the shade pel with color applied. The right shade pel is of high intensity and had a high percentage of the shade pel covered. In the physical operation of the machine there will be some smearing of the colors which provides some integration of intensity of the shade pels. The partial filling of shade pels need not be centered, and may, for example, start from the left.

The foregoing will be used in conjunction with other data processing and printing techniques. In particular, the final page bit maps are still very large and preferably would be compressed. Similarly, the shade pel memory clearly can be compressed, since only the upper left hand pel corresponding to each shade pels need be used, but operating efficiencies in addressing may be achieved by having that plane memory correspond in size to the color plane memories, since the operation frequently refers from one to the other. One modification would be to employ a different shade pel plane memory for individual color planes or for certain one of the color planes, allowing higher resolution for colors to which the eye is more sensitive.

We claim:

1. A method for composing in electronic memory page information in pel form for a page to be printed comprising storing in said electronic memory basic pel information defining binary information received, said storing being in separate regions of said memory for each of at least two hues of subtractive primary colors and for black, storing in said memory in a region for black basic pel information defining binary information received, storing in said memory in separate memory regions for each of at least two said hues of subtractive primary colors intensity information for predetermined groups of basic pels, said intensity information occupying parts of said memory regions otherwise occupied by said basic pel information, and storing in a separate region of said memory information defining the meaning of said groups of basic pels by identifying the previous storing of said intensity information for each of said predetermined groups of basic pels.

2. The method as in claim 1 in which said hues are cyan, magenta, and yellow and said group of pels comprises at least six of said basic pels.

3. The method as in claim 2 in which said group of pels comprises eight of said pels in a rectangle.

4. The method as in claim 3 in which said groups of basic pels are predetermined and said intensity information is entered in each said group when color and intensity information is received for any basic pel in each said group.

5. The method as in claim 1 in which said groups of basic pels are predetermined and said intensity information is entered in each said group when color and intensity information is received for any basic pel in each said group.

6. The method as in claim 2 in which said groups of basic pels are predetermined and said intensity information is entered in each said group when color and intensity information is received for any basic pel in each said group.

7. A method for composing in electronic memory page information in pel form for a page to be printed comprising storing in said electronic memory basic pel information defining binary information received, said storing being in separate regions of said memory for each of at least two primary colors and for black, storing in said separate memory regions for color intensity information for predetermined groups of basic pels, said intensity information occupying parts of said memory regions otherwise occupied by said basic pel information, and storing in a separate region of said memory information defining the previous storing of said intensity information for each of said predetermined groups of basic pels.

8. The method as in claim 7 in which said primary colors are cyan, magenta, and yellow and said group of pels comprises at least six of said basic pels.

9. The method as in claim 8 in which said group of pels comprises eight of said pels in a rectangle.

10. The method as in claim 9 in which said contiguous groups of basic pels are predetermined and said intensity information is entered in each said group when color and intensity information is received for any basic pel in each said group.

11. The method as in claim 9 in which said contiguous groups of basic pels are predetermined and said intensity information is entered in each said group when color and intensity information is received for any basic pel in each said group.

12. The method as in claim 8 in which said contiguous groups of basic pels are predetermined and said intensity information is entered in each said group when color and intensity information is received for any basic pel in each said group.

13. A method of printing color and line information on the same page comprising storing in electronic memory in a pel plane basic pel information for said line information, storing in electronic memory for each of at least two subtractive primary colors in a pel plane for each said primary color, color intensity information for said color information applicable to contiguous groups of basic pels, said pel plane for each color and for black being separate, storing in electronic memory separate from said pel planes information identifying the previous storing of said intensity information for said contiguous groups, and printing said basic pel information at pel locations in one predetermined intensity, and printing said color information in a part of said contiguous groups in an amount defined by said intensity information of each said continuous groups.

* * * * *